Figure 1:
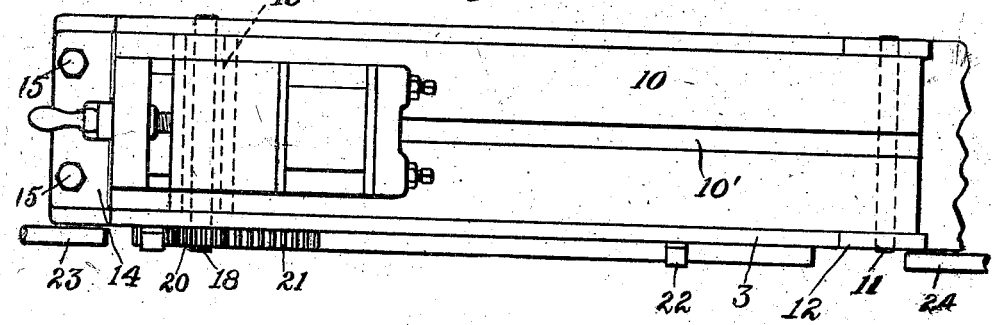

B. M. W. HANSON.
METAL WORKING MACHINE.
APPLICATION FILED MAR. 2, 1915.

1,200,610.

Patented Oct. 10, 1916.

Witnesses:
F. H. Elliott
L. Markel

Inventor.
B. M. W. Hanson

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

METAL-WORKING MACHINE.

1,200,610.   Specification of Letters Patent.   Patented Oct. 10, 1916.

Application filed March 2, 1915. Serial No. 11,492.

*To all whom it may concern:*

Be it known that I, BENGT M. W. HANSON, a citizen of the United States, residing at Hartford, in the county of Hartford and State of Connecticut, have invented certain new and useful Improvements in Metal-Working Machines, of which the following is a specification.

This invention relates to metal-working machines, the primary object of the invention being to provide means of an effective character for maintaining the work in solid and substantial relation with a tool during the action of the latter upon the former and at the same time for causing the work to recede from or clear the tool at the conclusion of such action and preferably until a repetition of such action. By reason of the construction mentioned I can insure proper results without marring or injuring the work of whatever nature the same may be.

In the drawings accompanying and forming part of the present specification I have illustrated in detail one of the several convenient forms of embodiment of the invention which to enable those skilled in the art to practise the same will be set forth in the following description. As will be inferred I do not restrict myself to this particular disclosure; I may depart therefrom in several respects within the scope of the invention defined by the claims following said description.

Figure 2:
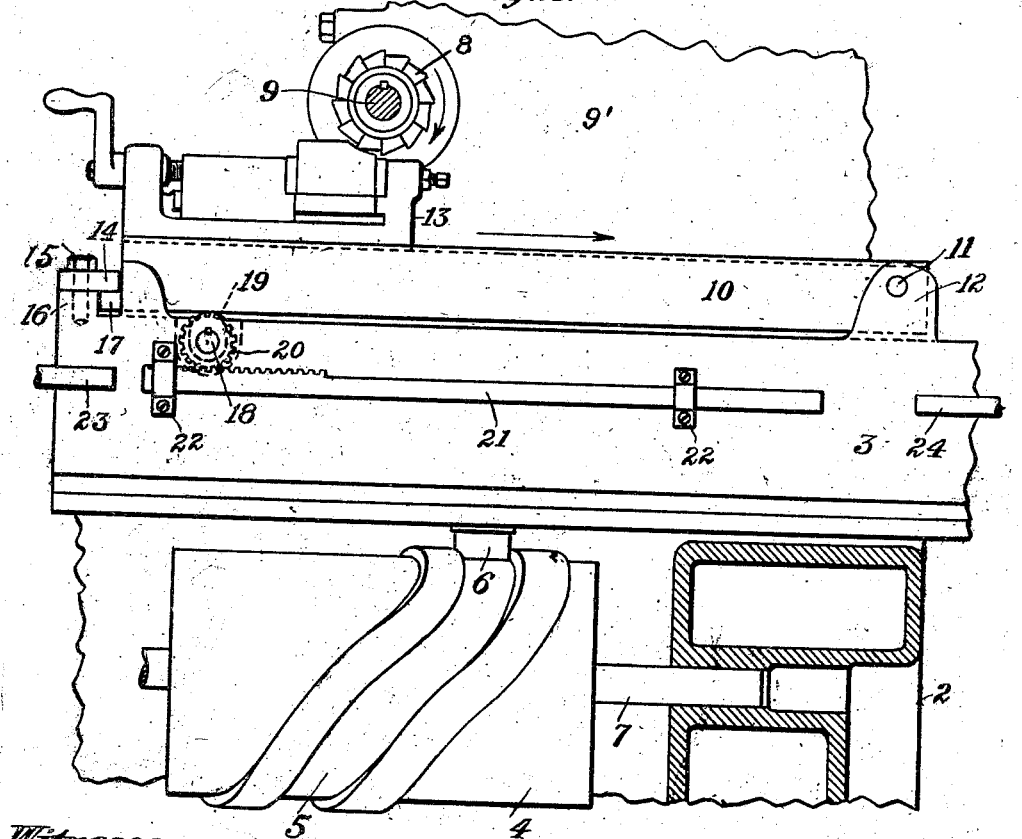

Referring to said drawings: Figure 1 is a top plan view of a metal-working machine involving my invention, with the head stock removed. Fig. 2 is a vertical sectional view of said machine.

Like characters refer to like parts in both views.

As will be understood I may embody my invention in machines of various kinds, although it is of particular advantage when incorporated in a milling machine as illustrated in said drawings. The different parts of the machine may be mounted upon a suitable frame; that shown comprises the base or bed 2 provided upon its top with suitable ways to receive for reciprocatory sliding movement the slide 3 constituting a suitable movably mounted work-carrier. Said work-carrier or slide may be operated in any desirable manner, for example by the cam-drum 4 which has a peripheral race 5 to receive the depending stud 6 on said work-carrier or slide. Said cam drum is suitably fastened to the shaft 7 extending longitudinally of the machine, the shaft and hence the cam drum being preferably continuously rotated in any proper manner. As the drum 4 rotates it first advances and then retracts the work carrier or slide 3.

The tool as already noted may be of any desired type; that shown is denoted by 8 and consists of a milling tool being fastened to the spindle 9 supported by the head stock 9' rising from and suitably rigidly connected with the base or bed 2. The reciprocatory work-carrier or slide 3 sustains in some suitable manner a work-holder to which the work is connected rigidly. This work-holder may vary decidedly as to construction, although it should be movably mounted. The work-holder 10 answers properly my requirements, it being shown as pivoted at one end as at 11 to a bracket or bearing 12 rising from the work carrier or slide 3. It will therefore be evident that said work-holder 10 can be moved into and out of operative positions, which as shown are up and down. Any suitable means may be provided for securing these actions in sequence. I will hereinafter describe means which satisfactorily answer in this respect. The work is usually connected with the work-holder 10 by a vise or clamp, that denoted by 13 answering satisfactorily. The vise 13 is rigid with the work holder 10 and as shown it is located on the upper side of the latter at the ends thereof opposite the pivot end.

At a predetermined point in the movement of the work carrier or slide 3 the work holder is moved to operative position to bring the surface of the work which is to be operated upon into the cutting plane, so that beyond said point cutting or milling can be effected, it being evident that the work holder is maintained in operative position during the milling or equivalent action. At the conclusion of said action, the work holder is caused to move from operative position and is maintained in this relation until a second cut is to be made when the work holder is again moved to operative position. It will, therefore, be clear that during a predetermined movement of the work carrier or slide 3, the work will be under the operation of the tool and for another period entirely free or clear of said tool.

To insure proper cutting by preventing chattering of the work, the work holder 10 when in operative position, that is elevated in the construction shown, is non-yieldingly held, best obtained by having said work holder bear against a suitable rigid stop or abutment as 14 which as shown consists of a plate fastened as by one or more screws 15 to the block 16 rigid with the work carrier or slide 3. The overhanging or active portion of this plate is adapted to coöperate with the projection or extension 17 at the free lower end of the work holder 10. At the proper point in the operation of the machine or practically just before the piece of work is to be milled, the work holder is elevated to carry said projection or extension 17 solidly and substantially against the inward overhanging portion of the plate 14, and this relation is continued until the milling tool has finished its cut upon the work. Said stop or abutment 14 constitutes, as will be clear, a convenient means for preventing reactive movement of the work holder 10 and therefore of the work rigidly mounted on said work holder while the cutter 8 is milling or otherwise operating upon the work. At this point the work holder is caused to lower, this movement in the present instance being a gravitative one. The work holder remains in its inoperative or lowered position until the time that a second cut should be made.

Supported by suitable bearings on the slide 3 is the shaft 18 to which is fastened a cam as 19 coöperative with the work holder 10. Fastened to said shaft 18 is the pinion 20 in mesh with the teeth of the rack bar 21 supported for reciprocation by suitable bearings or brackets as 22 upon the slide 3. This rack bar 21 is adapted to coöperate in alternation with suitable actuating members which as shown consist of dogs as 23 and 24 rigid with the base or bed 2 of the machine.

In Fig. 2 I have shown by the arrow the direction of rotation of the milling cutter 8 and by a second arrow the direction of advancing movement of the slide 3. Just after the cutter 8 has finished its operation upon the work, the forward end of the rack bar 21 will strike the stationary dog or stop 24 and as the slide 3 continues its movement the rack bar 21 will be held against movement by said stop with said slide, the consequence being that the rack bar 21 is relatively moved rearward as the slide 3 continues its advancing movement, by reason of which the pinion 21 and hence the shaft 18 and cam 19 will be rotated in such manner as to cause the cam to permit the work holder 10 to descend and the movement of the projection 17 away from the stop 14, the work in the vise 13 as the vise descends with the work holder 10 being moved below the cutting plane. Just after the several parts mentioned are lowered reverse or retractive movement of the slide 3 is effected by the cam drum 4. A short interval of time before the slide 3 has completed its retractive or reverse movement the outer or left end of the rack bar 21 will strike the stop 23, thus causing relatively a forward movement of said rack bar and the rotation of the pinion 21, shaft 18 and cam 19, so that the cam as it thus rotates can act on the under side of the work holder 10 to move the projection 17 firmly against the rigid stop 14, the extension engaging the stop during the last part of the retractive movement of the slide, so that when the slide is advanced by the drum 4 in the manner already described, the work in the vise 13 will be in the cutting plane. It will be clear that the work is lowered after a cut has been made and is maintained in this relation until before a second cut is to be made, so that on the backward movement of the slide 3, the cutter can in no wise affect the work.

The vise 13 is familiar in this art and needs no detailed description. It is obvious that it non-yieldingly clamps or engages the work and that in turn it is non-yieldingly or rigidly supported upon the work holder 10 which as shown has a way as 10' to receive a tongue or equivalent on the vise and thus provide for longitudinal adjustment of the latter.

What I claim is:

1. A metal-working machine comprising a reciprocatory slide, a work holder pivotally supported on the slide and automatic means for causing the raising and lowering of the work-holder relatively to the slide at predetermined points in the reciprocation thereof, and means for preventing reactive movement of the work-holder when the same is in the raised position thereof.

2. A metal-working machine comprising a reciprocatory slide, a work-holder pivotally supported by the slide, a pair of fixed elements supported independently of the slide, and means actuated by said fixed elements at predetermined points in the reciprocation of the slide, for causing the raising and lowering of the work-holder relatively to the slide.

3. A metal-working machine comprising a reciprocatory slide, a work-holder pivotally supported by the slide, a cam element supported by the slide, and means for operating the cam element at predetermined points in the reciprocation of the slide, to cause the same to raise and lower said work-holder with respect to said slide.

4. A metal-working machine comprising a reciprocatory slide, a work-holder pivotally supported on the slide, a milling tool in coöperative relation with the work-holder and means for operating upon the work-holder to cause the work to be positioned for milling before the work reaches the tool and for causing the action of the work-holder to carry the work free of the tool approximately at the conclusion of a milling operation.

5. A metal-working machine comprising a reciprocatory slide, a work-holder pivotally supported on the slide and means for causing the work holder to move away from and to then approach the slide at predetermined points in the reciprocation of the slide.

6. A metal-working machine comprising a reciprocatory slide, a work-holder pivotally supported on the slide and means for causing the work-holder to move away from and to then approach the slide at predetermined points in the reciprocation of the latter, and a fixed element on the slide to be engaged by the work-holder when the same is in a position away from the slide.

7. A metal working machine comprising a reciprocatory slide, a work holder pivotally supported on the slide, means for automatically raising the work holder when the slide is practically at the limit of its retractive movement, for maintaining it in the elevated position until the advancing movement is practically completed and for causing lowering of the same at the conclusion of the advancing movement and for maintaining the work holder lowered until a second retractive movement has been practically completed, a rigid stop engageable by the work holder when in the elevated position, and a tool to operate upon the work when the work holder is in the elevated position.

8. A metal-working machine comprising a reciprocatory slide, a work-holder pivotally supported on the slide, mechanism for moving and for non-yieldingly holding the work-holder in operative position for a predetermined time and for moving the work-holder to inoperative position and maintaining it in said inoperative position for a predetermined time and a tool to act on the work carried by the work-holder when the latter is in its operative position.

9. The combination of a reciprocatory slide, a work holder pivotally mounted on the slide, a rigid stop carried by the slide, a pinion supported by the slide, a reciprocatory rack bar supported for reciprocation by the slide and the teeth of which are in mesh with those of the pinion, a cam rotatable with the pinion, abutments supported independently of the slide for operating the rack bar and thereby the pinion and cam whereby the cam will raise and lower the work holder approximately at the conclusion of the retractive and advance movements of the slides, the work holder when elevated engaging said stop, and a tool to operate on the work when the work holder is elevated.

10. A metal working machine comprising a reciprocatory slide, a work holder pivotally mounted on the slide, automatically operative means whereby the work holder is non-yieldingly swung upwardly with respect to the slide at a predetermined point in the movement of said slide, and fixed stop means on the slide engageable by the work holder when in the elevated position thereof.

11. The combination of a work carrying member provided with work supporting means, automatic means for moving the work carrying member forwardly and backwardly, a cutting tool to mill the work on the forward movement of the work carrying member, and automatic mechanism for causing a swinging movement of the work at a predetermined point in the advance of the work carrying member to move the work across the cutting plane of the tool and to position the work to be milled and for causing opposite swinging movement of the work at the conclusion of the milling operation and for preventing reactive movement of the work while the same is being milled.

12. The combination of a work carrying member provided with work supporting member, automatic means for moving the work carrying member forwardly and backwardly, a cutting tool to mill the work on the forward movement of the work carrying member, and automatic mechanism for causing a swinging movement of the work at a predetermined point in the forward movement of the work carrying member to move the work across the cutting plane of the tool and position the work to be milled, for swinging the work in the opposite direction at the conclusion of the milling operation and for non-yieldingly positively preventing opposite movements of the work during the milling operation.

13. The combination of a work carrying member provided with work supporting means, automatic means for moving the work carrying member forwardly and backwardly, a cutting tool to mill the work on the forward movement of the work carrying member, and automatic mechanism for causing a swinging movement of the work at a predetermined point in the forward movement of the work carrying member to move the work across the cutting plane of the tool and position the work to be milled, for swinging the work in the opposite direction at the conclusion of the milling operation and for also non-yieldingly holding the work in position to be milled, and relatively fixed means movable with the work carrying member for receiving the reactive thrusts of the work.

In testimony whereof I affix my signature in presence of two witnesses.

BENGT M. W. HANSON.

Witnesses:
W. H. STORRS,
C. M. GELLERT.